United States Patent
Shaffer et al.

(10) Patent No.: US 7,929,678 B2
(45) Date of Patent: Apr. 19, 2011

(54) METHOD AND SYSTEM FOR MANAGING CONFERENCE RESOURCES

(75) Inventors: Shmuel Shaffer, Palo Alto, CA (US); Labhesh Patel, San Francisco, CA (US); Steven L. Christenson, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 1419 days.

(21) Appl. No.: 11/190,778

(22) Filed: Jul. 27, 2005

(65) Prior Publication Data

US 2007/0036317 A1    Feb. 15, 2007

(51) Int. Cl.
 *H04M 3/42* (2006.01)
(52) U.S. Cl. ............... 379/202.01; 379/93.21; 379/158; 379/205.01; 370/260; 370/261; 370/262; 370/263; 370/266; 348/14.08; 348/14.09; 348/14.1; 348/E7.083
(58) Field of Classification Search ............... 379/93.21, 379/158, 202.01, 205.01; 370/260, 261, 370/262, 263, 266
See application file for complete search history.

(56) References Cited

U.S. PATENT DOCUMENTS

| | | | |
|---|---|---|---|
| 5,124,912 A | 6/1992 | Hotaling et al. | |
| 5,483,587 A | 1/1996 | Hogan et al. ................... | 379/202 |
| 5,491,797 A | 2/1996 | Thompson et al. ....... | 395/200.03 |
| 5,546,449 A | 8/1996 | Hogan et al. ................... | 379/202 |
| 5,631,904 A * | 5/1997 | Fitser et al. ..................... | 370/261 |
| 5,680,392 A * | 10/1997 | Semaan ......................... | 370/261 |
| 5,790,974 A | 8/1998 | Tognazzini | |
| 5,903,637 A | 5/1999 | Hogan et al. ................... | 379/203 |
| 5,963,913 A | 10/1999 | Henneuse et al. ................ | 705/9 |
| 6,016,478 A | 1/2000 | Zhang et al. ...................... | 705/9 |
| 6,101,480 A | 8/2000 | Conmy et al. | |
| 6,205,122 B1 | 3/2001 | Sharon et al. ................. | 370/254 |
| 6,282,278 B1 | 8/2001 | Doganata et al. ............. | 379/202 |
| 6,324,169 B1 | 11/2001 | Roy ............................. | 370/260 |
| 6,324,517 B1 | 11/2001 | Bingham et al. .................. | 705/8 |
| 6,377,987 B1 | 4/2002 | Kracht .......................... | 709/220 |

(Continued)

FOREIGN PATENT DOCUMENTS

WO    WO 2004/114662    12/2004

OTHER PUBLICATIONS

Internet Engineering Task Force (IETF) Internet Draft, "*SIP for Presence*," J. Rosenberg (Lucent Technologies, Bell Laboratories) and H. Schulzrinne (Columbia University), http://www.alternic.org/drafts/drafts-r-s/draft-rosenberg-sip-pip-00.txt., Nov. 13, 1998.

(Continued)

*Primary Examiner* — Curtis Kuntz
*Assistant Examiner* — Yosef K Laekemariam
(74) *Attorney, Agent, or Firm* — Baker Botts L.L.P.

(57) ABSTRACT

A method for managing conference resources includes receiving from an endpoint of a user a call to join a multipoint conference between a plurality of participants. Each participant communicates on the multipoint conference through a respective endpoint. The method includes determining that an insufficient amount of resources exist to allow the user to communicate on the multipoint conference and determining participation instructions to enable the user to communicate on the multipoint conference. The method also includes communicating the participation instructions. Location information associated with the user and location information associated with at least one of the plurality of participants may be used to determine the participation instructions to enable the user to communicate on the multipoint conference.

27 Claims, 2 Drawing Sheets

U.S. PATENT DOCUMENTS

| | | | |
|---|---|---|---|
| 6,411,605 B1 | 6/2002 | Vance et al. ............... | 370/261 |
| 6,414,635 B1 | 7/2002 | Stewart et al. ............ | 342/457 |
| 6,480,830 B1 | 11/2002 | Ford et al. .................. | 705/9 |
| 6,516,345 B1 | 2/2003 | Kracht ....................... | 709/220 |
| 6,614,450 B1 | 9/2003 | Vossler ...................... | 345/751 |
| 6,646,997 B1 * | 11/2003 | Baxley et al. ............... | 370/260 |
| 6,754,323 B1 * | 6/2004 | Chang et al. ............... | 379/205.01 |
| 6,876,734 B1 | 4/2005 | Summers et al. ........... | 379/202.01 |
| 6,898,569 B1 | 5/2005 | Bansal et al. | |
| 7,046,779 B2 | 5/2006 | Hesse | |
| 7,139,722 B2 | 11/2006 | Perrella et al. | |
| 7,343,312 B2 | 3/2008 | Capek et al. | |
| 7,395,221 B2 | 7/2008 | Doss et al. | |
| 2002/0118688 A1 | 8/2002 | Jagannathan ............... | 370/410 |
| 2002/0184063 A1 | 12/2002 | Kaufman et al. | |
| 2003/0046304 A1 | 3/2003 | Peskin et al. | |
| 2004/0161080 A1 | 8/2004 | Digate et al. ............... | 379/88.17 |
| 2006/0045029 A1 | 3/2006 | Ethier et al. | |
| 2006/0062367 A1 | 3/2006 | Christenson et al. | |

OTHER PUBLICATIONS

PCT, International Search Report and Written Opinion (ISA/EPO) for PCT/US2006/027779, 15 pages, Jan. 2, 2007.

U.S. Appl. No. 09/902,946, filed Jul. 11, 2001, entitled "*System and Method for Bandwidth and Conference Resource Reservation*", 37 pages specification, claims and abstract, 3 pages of drawings, inventors Shmuel Shaffer et al.

Cisco Systems, Inc., "*Cisco Conference Connection*", Data Sheet, Internet Publication, http://www.cisco.com/warp/public/cc/pd/unco/cvco/prodlit/confr_ds.pdf, 7 pages, Jun. 2003.

Latitude Communications, "*Meetingplace Web 4.0, Secure, cost-effective web conferencing for enterprises*", © 2003 Latitude Communications, Inc., Internet Publication, http://www.latitude.com/pdfs/Web4.0.pdf, 2 pages, 2003.

U.S. Appl. No. 10/754,963, filed Jan. 8, 2004, entitled "*Method and System for Managing Conference Resources*", 43 pages specification, claims and abstract, 2 pages of drawings, inventors Shmuel (nmi) Shaffer et al.

U.S. Appl. No. 10/944,357, filed Sep. 17, 2004, entitled "*System and Method for Scheduling Conference Resources*", 41 pages specification, claims and abstract, 2 pages of drawings, inventors Steven L. Christenson et al.

U.S. Appl. No. 11/046,320, filed Jan. 28, 2005, entitled "*Method and System for Reserving Resources of a Multipoint Conference*", 44 pages specification, claims and abstract, 2 pages of drawings, inventors Shmuel (nmi) Shaffer et al.

U.S. Appl. No. 11/046,067, filed Jan. 28, 2005, entitled "*Method and System for Reserving Facility Resources for a Conference*", 42 pages specification, claims and abstract, 2 pages of drawings, inventors Shmuel (nmi) Shaffer et al.

Christenson et al., U.S. Appl. No. 10/944,357, filed Sep. 17, 2004, Communication from the United States Patent and Tradmark Office mailed Sep. 25, 2008.

Christenson et al., U.S. Appl. No. 10/944,357, filed Sep. 17, 2004, Communication from the United States Patent and Tradmark Office mailed Mar. 19, 2009.

EmergingSoft (EmergingSoft.com [online], [retrieved on Sep. 18, 2008]. Retrieved from the Internet: URL: http://web.archive.org/web/20030801185911/http://emergingsoft.com/), Sep. 18, 2008.

* cited by examiner

METHOD AND SYSTEM FOR MANAGING CONFERENCE RESOURCES

TECHNICAL FIELD OF THE INVENTION

The present invention relates generally to communication systems and, more particularly, to a method and system for managing conference resources.

BACKGROUND OF THE INVENTION

Historically, telecommunications have involved the transmission of voice and fax signals over a network dedicated to telecommunications, such as the Public Switch Telephone Network (PSTN) and a Private Branch Exchange (PBX). Similarly, data communications between computers have been historically transmitted on a dedicated data network, such a Local Area Network (LAN) or a Wide Area Network (WAN). Currently telecommunications and data transmissions are being merged into an integrated communication network using technology such as Voice over Internet Protocol (VoIP). Since many LANs and WANs transmit computer data using Intranet Protocol (IP), VoIP uses this existing technology to transmit voice and fax signals by converting these signals into digital data and encapsulating the data for transmission over an IP network.

Traditional communication networks often support multipoint conferences between a number of participants using different communication devices. A multipoint conference unit (MCU) is used to couple these devices, which allows users from distributed geographic locations to participate in the conference. The conference may be audio only (e.g., a teleconference) or may include video conferencing/broadcasting.

Conference systems utilize various resources when hosting a conference. One of the key resources that conference administrators may need to indicate when setting up a conference call is the number of ports required for the conference. Reservation of the "right" number of conferencing port can be a balancing act. If too few ports are reserved for the conference, some people who would like to join and contribute may be left out because there may not be enough resources to accommodate them. However, if too many ports are reserved then some ports may remain unused. This increases the cost of conducting a meeting and potentially prevents other users from conducting a conference at the same time.

Numerous algorithms and systems have been developed to facilitate more flexible reservation systems. For example, some systems include methods for reserving network bandwidth that would be required for conducting a VoIP conference. Some systems include methods for reclaiming and recycling conference ports of users who leave a given conference. In addition, some systems include methods for finding and booking conference rooms (and/or other fixed resources). For example, users may have knowledge of available local conference resources, and scheduling systems may consult the location information of the scheduler (and/or invited participants) to match with the nearest available conference resource(s).

SUMMARY OF THE INVENTION

The present invention provides a method and system for managing conference resources that substantially eliminates or reduces at least some of the disadvantages and problems associated with previous methods and systems.

In accordance with a particular embodiment of the present invention, a method for managing conference resources includes receiving from an endpoint of a user a call to join a multipoint conference between a plurality of participants. Each participant communicates on the multipoint conference through a respective endpoint. The method includes determining that an insufficient amount of resources exist to allow the user to communicate on the multipoint conference and determining participation instructions to enable the user to communicate on the multipoint conference. The method also includes communicating the participation instructions.

Determining participation instructions to enable the user to communicate on the multipoint conference may comprise using location information associated with the user and location information associated with at least one of the plurality of participants to determine participation instructions to enable the user to communicate on the multipoint conference. The participation instructions may comprise instructions to the user to join the at least one of the plurality of participants to participate on the multipoint conference using the respective endpoint of the at least one of the plurality of participants. The participation instructions may comprise instructions to a first participant of the plurality of participants to join a second participant of the plurality of participants to participate on the multipoint conference using the respective endpoint of the second participant. The insufficient amount of resources may comprise an insufficient amount of conference ports or DSP resources.

In accordance with another embodiment, a method for managing conference resources includes receiving from an endpoint of a user a call to join a multipoint conference between a plurality of participants. Each participant communicates on the multipoint conference through a respective endpoint. The method includes determining, using location information associated with the user or at least one of the plurality of participants, participation instructions comprising instructions for the user or the at least one the plurality of participants to join another of the plurality of the participants to participate on the multipoint conference using the respective endpoint of the another of the plurality of participants. The method also includes communicating the participation instructions to the user or the at least one of the plurality of participants.

Technical advantages of particular embodiments include systems and methods are provided that communicate to conference participants and new callers participation instructions comprising, for example, suggestions to participate on a conference based on location to reduce and/or use more efficiently conference resources. For example, participants may be instructed to participate using an endpoint of another participant to reduce the use of conference resources. Accordingly, system resources may be saved and used more efficiently, enabling additional users to participate on the conference.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments of the invention and their advantages, reference is now made to the following descriptions, taken in conjunction with the accompanying drawings, in which.

DETAILED DESCRIPTION OF THE INVENTION

Figure 1:
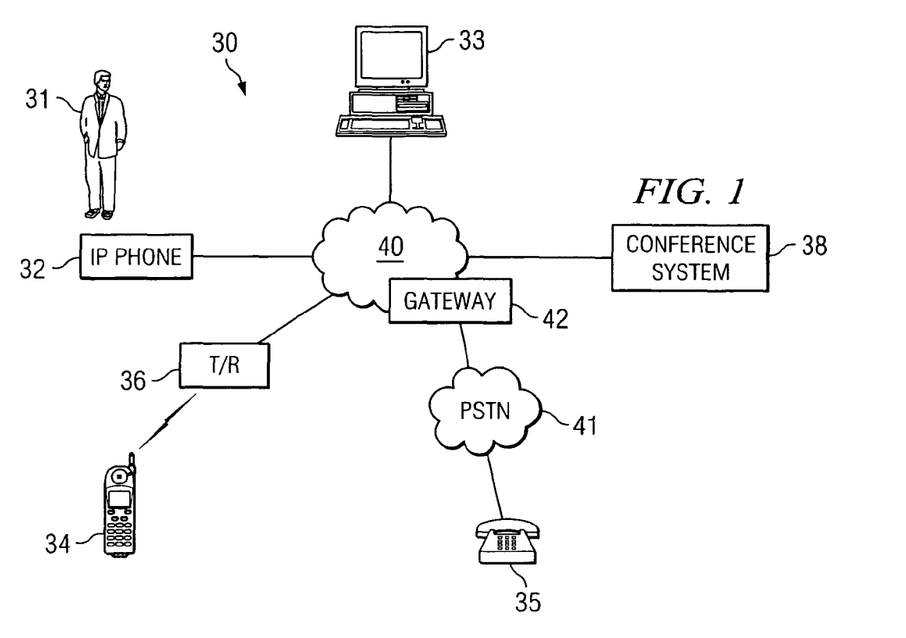
FIG. 1 illustrates a communication system with a plurality of endpoints and a conference system, in accordance with a particular embodiment.

FIG. 1 illustrates a communication system 30 including a plurality of endpoints 32-35 having the ability to establish communication sessions with each other and/or a conference system 38. Such communication sessions may be established using communication networks 40, 41 and/or additional endpoints, components or resources coupled with communication networks 40 or 41. Conference system 38 provides multipoint conference services, including conference hosting and/or facilitation, to users of endpoints 32-35, such as user 31 of endpoint 32. In particular embodiments, conference system 38 may comprise a multipoint conference unit (MCU) that hosts, or accommodates, multipoint conferences between and among endpoints 32-35. An MCU or other entity may be considered to be hosting a conference if it is one or more of the components that accommodates or otherwise provides conference resources to facilitate the conference.

In accordance with the present invention, systems and methods are provided that communicate to conference participants and new callers participation instructions comprising, for example, suggestions to participate on a conference based on location to reduce and/or use more efficiently conference resources. For example, participants may be instructed to participate using an endpoint of another participant to reduce the use of conference resources. Accordingly, system resources may be saved and used more efficiently, enabling additional users to participate on the conference.

In some embodiments, the conference may be a multipoint conference such as a Meet Me Conference call. A Meet Me Conference call is an arrangement by which a user can dial a specific, pre-determined telephone number and enter a security access code to join a conference with other participants. The user is automatically connected to the conference through a conference bridge of conference system 38. Conference participants may call in at a preset time or may be directed to do so by a conference coordinator. Meet Me Conferences may be set up through a teleconferencing service provider, generally with the capability to conference thousands of participants in a single conference call.

Endpoints 32-35 may be any combination of hardware, software and/or encoded logic that provide communication services to a user. For example, endpoints 32-35 may include a telephone, a mobile phone, a computer running telephony software, a video monitor, a camera or any other communication hardware, software and/or encoded logic that supports the communication of media using communication networks 40 and 41. In the illustrated embodiment, endpoints 32-34 include an internet protocol (IP) phone, a personal computer and a cellular phone, respectively. A wireless base station transmitter/receiver 36 couples endpoint 34 with communication network 40. Endpoints 32-35 may also include unattended or automated systems, gateways, other intermediate components or other devices that can establish media sessions. Although FIG. 1 illustrates four endpoints 32-35, communication system 30 contemplates any number and arrangement of endpoints 32-35 for communicating media and participating in a conference. For example, the described technologies and techniques for establishing a communication session between or among endpoints 32-35 may be operable to establish a multipoint conference between more than two endpoints 32-35.

Although specific communication networks 40 and 41 are illustrated in FIG. 1, the term "communication network" should be interpreted as generically defining any network capable of transmitting audio and/or video telecommunications signals, data and/or messages. Communication network 40 may be any computer or communication network capable of coupling two or more endpoints 32-35, for communication. In the illustrated embodiment, communication network 40 is a wide area network (WAN) that enables communication between a plurality of endpoints distributed across multiple cities and geographic regions, and communication network 41 is a public switched telephone network (PSTN). However, communication networks 40 and/or 41 may comprise one or more networks, including the Internet, the public switched telephone network, local area networks (LANs), global distributed networks such as intranets and extranets and/or other form of wireless or wireline communication networks. Generally, communication networks 40 and 41 provide for the communication of packets, cells, frames and/or other portions of information (generally referred to as packets) between and among endpoints 32-35. Communication paths for the communication of such packets may include any combination of routers, hubs, switches, gateways (e.g., gateway 42) or other hardware, software or embedded logic implementing any number of communication protocols that allow for the exchange of packets in communication system 30.

In a particular embodiment, communication network 40 employs communication protocols that allow for the addressing or identification of endpoints 32-35 coupled to communication network 40. For example, using Internet protocol, each of the components coupled together by communication network 40 in communication system 30 may be identified in information directed using IP addresses. In this manner, communication network 40 may support any form and combination of point-to-point, multicast, unicast or other techniques for exchanging media packets among components in communication system 30.

Any given communication session between two of endpoints 32-35 may include the transfer of packets across one or more communication paths that couple endpoints 32-35 and/or conference system 38 across communication network 40. Such paths may include any combination of network components, gatekeepers, call managers, routers, hubs, switches, gateways, endpoints or other hardware, software or embedded logic implementing any number of communication protocols that allow for the exchange of packets in communication system 30.

Network 40 may be directly coupled to other IP networks including, but not limited to, the Internet. Since IP networks share a common method of transmitting data, telecommunication signals may be transmitted between telephony devices located on different, but interconnected, IP networks. In addition to being coupled to other IP networks, network 40 may also be coupled to non-IP telecommunication networks through the use of gateway 42. For example, network 40 is coupled to Public Switched Telephone Network (PSTN) 41. PSTN 41 includes switching stations, central offices, mobile telephone switching offices, pager switching offices, remote terminals and other related telecommunications equipment that are located across the country.

IP networks transmit data (including voice and video data) by placing the data in packets and sending each packet individually to the selected destination. Unlike a circuit-switched network (like PSTN 41), dedicated bandwidth is not required for the duration of a call or fax transmission over IP networks. Instead, each telephony device sends packets across the network as they become available for transmission. This feature makes bandwidth available for other data when voice or fax data is not being transmitted.

The technology that allows telecommunications to be transmitted over an IP network may be referred to as Voice over IP (VoIP). In the illustrated embodiment, endpoints 32-34 and conference system 38 are IP telephony devices. IP telephony devices have the capability of encapsulating a user's voice (or other inputs) into IP packets so that the voice can be transmitted over network 40. Similarly, IP telephony devices 32-34 have the capability of capturing and encapsulating video into IP packets so that the video can be transmitted over network 40. Conversely, IP telephony devices 32-34 have the capability of receiving audio or video IP packets from the network 40 and playing the audio or video data to a user.

A codec (coder/decoder) at the endpoint converts the voice, video or fax signals generated by the users of the telephony devices from analog media signals into digital form. The codec may be implemented either in software or as special-purpose hardware in the endpoints. In the case of an IP telephone, as the user speaks into the handset, the codec converts the analog voice signals into digital data. The digitally encoded data is then encapsulated into IP packets so that it can be transmitted over network 40. Conversely, another codec at the receiving endpoint converts the digital data into analog media for the users of the telephony devices. In the case of an IP telephone, digital data from IP encapsulated packets are received from the network 40. The codec at the receiving endpoint converts the digital voice, video or fax data from the network 40 into analog media to be played to the users of the telephony devices.

Gateway 42 may accomplish several functions, such as converting analog or digital circuit-switched data transmitted by PSTN 41 to packetized data transmitted by network 40 and vice-versa. When voice data packets are transmitted from network 40, gateway 42 retrieves the data contained in the incoming packets and converts this digital data to the analog or digital format used by the PSTN trunk to which gateway 42 is coupled. Since the digital format for voice transmissions over an IP network is often different than the format used on the digital trunks of PSTN 41, the gateway provides conversion between these different digital formats, which is referred to as transcoding. Gateway 42 also translates between the VoIP call control system (e.g., MGCP, H.323, SIP, etc.) and other signaling protocols (e.g., SS7, T1, ISDN, etc.), used in PSTN 41.

For voice transmissions from PSTN 41 to network 40, the process is reversed. In a particular embodiment, gateway 42 takes the incoming voice transmission (in either analog or digital form) and converts it into the digital format used by network 40. The digital data is then encapsulated into IP packets and transmitted over network 40.

Figure 2:
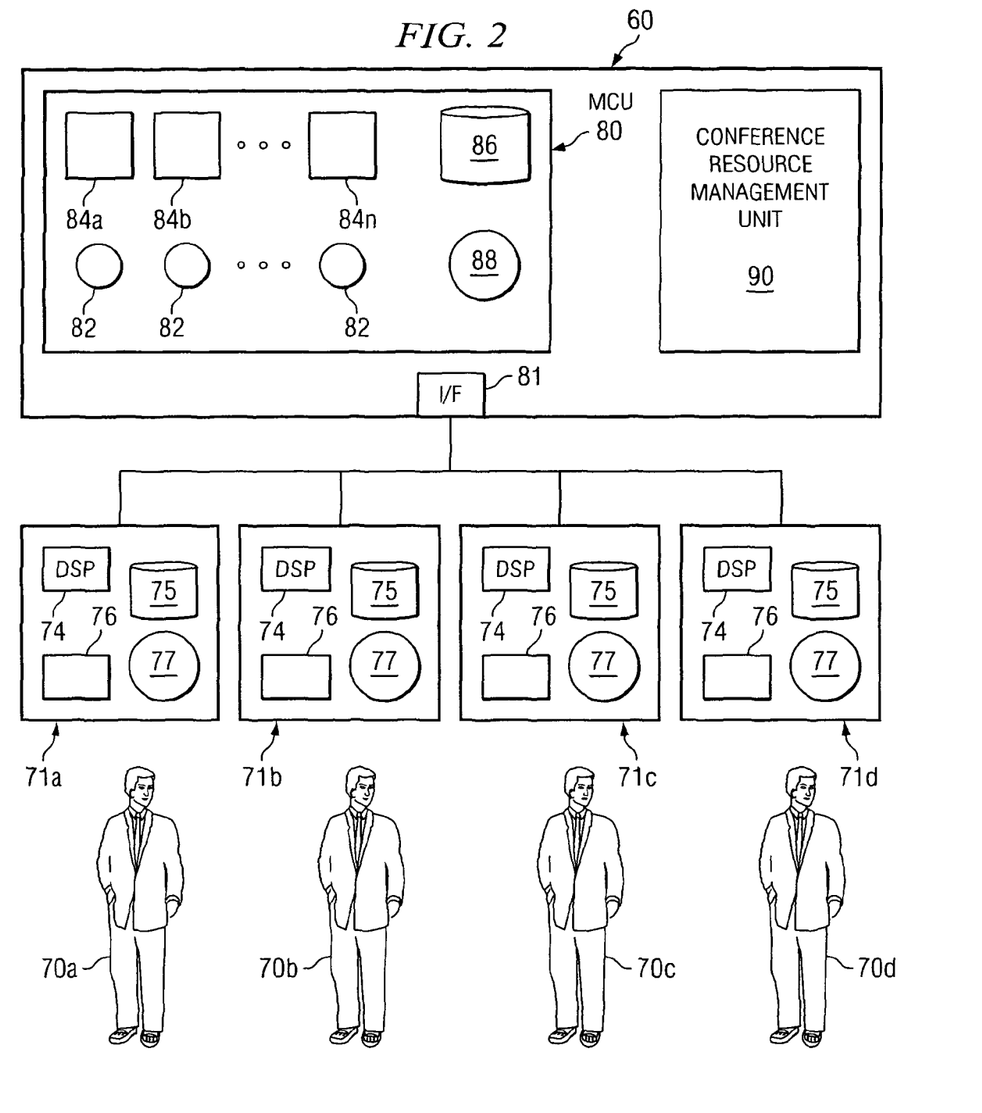
FIG. 2 illustrates a conference system with a multipoint conference unit and a conference resource management unit, in accordance with a particular embodiment.

FIG. 2 illustrates a conference system 60 coupled to a plurality of endpoints 71, in accordance with a particular embodiment. Conference system 60 provides conference services, including conference hosting and/or facilitation, to users of endpoints 71 and may provide similar functionality as that provided by conference system 38 discussed above. In the illustrated embodiment, conference system 60 includes an MCU 80, a conference resource management unit 90 and an interface 81 through which conference system 60 receives calls for conference. MCU 80 provides multipoint conference functionality between participants/users 70*a*-70*d* using endpoints 71*a*-71*d*, respectively. Conference resource management unit 90 manages resources of conference system 60, such as conference ports, bandwidth and DSP resources.

Endpoints 71*a*-71*d* may be similar to one or more of the endpoints described above with respect to FIG. 1, such as IP phone endpoint 32. It should be understood that endpoints 71*a*-71*d* may be coupled to components of conference system 60 such as MCU 80 and conference resource management unit 90 through one or more communication networks, such as communication networks 40 and 41 described above with respect to FIG. 1 which may include one or more WANs or LANs as indicated above.

In the illustrated embodiment, endpoints 71*a*-71*d* each include a digital signal processor (DSP) 74, memory 75, user interface 76 and a processor 77. DSP 74 includes a codec that converts voice, video or fax signals generated by the users of the telephony devices from analog media signals into digital form. The codec may be implemented either in software or as special-purpose hardware in the endpoints.

Memory 75 may include any form of volatile or nonvolatile memory including, without limitation, magnetic media, optical media, random access memory (RAM), read only memory (ROM), removable media or any other suitable local or remote memory component. Memory 75 may store information about the endpoint and/or its user(s), such as location information related to the endpoint. Processor 77 may comprise one or more microprocessors, controllers or any other suitable computing devices or resources. In some embodiments, a processor 77 may determine an endpoints location, for example, by accessing GPS information received by a location manager, a GPS device of the endpoint or otherwise.

User interface 76 may include a microphone, video camera, speaker, keyboard, video display, LCD display and/or other device. In some embodiments, an endpoint's user interface 76 may be coupled with components that include a microphone, video camera, speaker, keyboard, video display and/or other device, rather than incorporating such components into the endpoint.

In some embodiments, endpoints 71 may include hardware, software or encoded logic that facilitates conference system 60 in the determination of the location of endpoints 71. For example, an endpoint 71 may include a GPS receiver that receives GPS information for transmission to conference system 60 so that conference system 60 knows the endpoint's location. In some cases, an endpoint 71 may include an application such as a location manager to facilitate the determination of the endpoint's location.

MCU 80 acts as an intermediary during the multipoint communication conference, collects audio and/or video streams transmitted by the participants through their endpoints and distributes such streams to participants of the multipoint conference at their endpoints. MCU 80 may include any bridging or switching device used in support of multipoint conferencing, including videoconferencing. In various embodiments, MCU 80 may include hardware, software and/or embedded logic. MCU 80 may be configured to support any number of conference endpoints communicating on any number of conferences, simultaneously. MCU 80 may be in the form of customer provided equipment (CPE, e.g., beyond the network interface) or may be embedded in a wide area network (WAN). Examples of multipoint conference unit standards are defined in ITU-T H.323, with T.120 describing generic conference control functions. MCU 80 utilizes certain resources to effectively host each conference.

In the illustrated embodiment, MCU 80 includes a plurality of digital signal processors (DSPs) 82, a plurality of communication ports 84a-84n, a processor 88 and memory 86. DSPs 82 include codecs that decode received media streams so that they may be bridged together to form a mixed stream that is coded by the DSPs for transmission to conference participants. In particular embodiments, MCU 80 may include software functioning as a DSP on a general purpose central processing unit, such as processor 88. Communication ports 84 may comprise audio and/or video communication ports.

Memory 86 may be any form of volatile or nonvolatile memory including, without limitation, magnetic media, optical media, random access memory (RAM), read only memory (ROM), removable media or any other suitable local or remote memory component. Processor 88 may be a microprocessor, controller or any other suitable computing device or resource.

Conference resource management unit 90 may comprise any suitable hardware, software or encoded logic to accomplish the functionality described herein, such as a processor or controller executing software. The conference resources managed by conference resource management unit 90 may include any hardware or software component utilized by an MCU for hosting a conference between participants. Conference resources may include, for example, bandwidth, audio and video communication ports and DSP resources for transcoding or mixing. Resources available to MCUs may be utilized across any number of conferences taking place at the same time between any number of endpoints. For example, if an MCU has a certain number of communication ports available for conference use, one conference may utilize some of the communication ports while another conference taking place at the same time may utilize the rest of the communication ports. If conference participants leave a conference, the communication ports and other resources utilized by those conference participants may be made available to other participants of that conference or to other conferences.

As indicated above, particular embodiments utilize location information to identify the location of a conference participant or user who attempts to join a conference along with the location information of the other participants who may already be participating on the conference. The identified locations of the joining conference participant and the other conference participants are then used to more efficiently allocate resources of conference system 60.

The specific locations of conference participants may be identified using any suitable method. In particular embodiments, GPS information may be used to identify participant locations. For example, a participant's endpoint 71 used by the participant to participate on the conference may include a GPS receiver, and the endpoint' may transmit its location or GPS information in endpoint communications. Some cell phones and other endpoints today include such GPS capability. As another example, an endpoint's location may be determined according to the location of a base station which receives wireless endpoint communications for transmission to conference system 60. In some cases, an emergency responder that identifies the location of callers (e.g., 911 callers) in an emergency may be used to identify an endpoint's location. In some cases a discovery protocol used to obtain protocol addresses of devices may be used. In some embodiments a call manager may be used that maintains a listing, table or other organization of information about users/participants and endpoints of the communication system. Presence functionality (e.g., through a presence server) may also be used to determine location information of users and/or endpoints. As indicated, particular embodiments may utilize varying methods to obtain locations of users and/or endpoints used by conference participants to participate on a conference.

As an example of particular embodiments in operation, assume that user 70a attempts to join an ongoing conference hosted or otherwise facilitated by conference system 60. Users 70b-70d are currently participating in the ongoing conference. In addition, assume that conference system 60 does not have any free ports or other conference resources through which additional participants, such as user 70a, may join the conference. This may occur, for example, as a result of overall system or hardware limits or as a result of not reserving enough ports or other resources with the conference system for the conference. When this happens with existing conference systems the systems may play an announcement to the caller advising them that all ports are currently busy. However, in particular embodiments, upon detecting that new participant 70a attempts to join the conference and that there are no free ports to accommodate him, conference resource management unit 90 determines the location of the other participants and, rather than play a prompt "All of the ports are busy; you cannot join the conference call," conference resource management unit 90 transmits instructions based on the locations of user 70a and/or users 70b-70d to enable user 70a to join the conference. For example, conference resource management unit 90 may locate the nearest current participant 70b-70d to user 70a and may advise user 70a that all reserved ports are busy but he may join the conference from the location of the nearest participant 70b-70d. As an example, if user 70b is the nearest participant to user 70a and is participating on the conference from Conference Room A, then conference system 60 may play the following prompt: "All ports are busy; you may join the conference from Conference Room A." As another example, conference resource management unit 90 may identify the other current participants 70b-70d, for example, based on their IP addresses as derived from an emergency responder (e.g., the Cisco Emergency Responder of Cisco Systems, Inc.), using a call manager, IP addresses, caller ID or other methods, and may play the prompt: "All of the ports are busy; you join the conference from the office or room of [participant 70b], [participant 70c] or [participant 70d]."

In some cases, conference resource management unit 90, according to configuration or operational rules, may not allow a new participant 70a to join a conference from the same location as another particular participant even though the location of the other particular participant may make it easy for new participant 70a to join. For example, operational rules may dictate that certain high priority (e.g., organization executives) or other personnel cannot have any additional users joining from their location. In addition, the nearest location to the new participant 70a may be a conference room or other location that is currently full and cannot accommodate additional participants. Particular embodiments may utilize varying operational rules and configurations for determining one or more locations from which a new participant can join a conference when conference system ports or other resources are full.

In some embodiments, conference resource management unit 90 may detect that user 70a attempting to join the conference is not in proximity to any other caller or a conference room. For example, user 70a may be attempting to use his cell phone to join the conference while driving to work. In this case, conference resource management unit 90 may play the following prompt to the new participant 70a: "All of the conference resources are busy; please hold the line as we attempt to secure additional conference resources for you."

Conference resource management unit 90 may then identify two or more other conference participants currently on the conference who may be in close proximity to each other or who may otherwise be able to participate from the same location. For example, assume that participants 70*c* and 70*d* are in close proximity to each other. Conference resource management unit 90 may request that these two users congregate in the same room to free up some resources they are currently using (e.g., one of two conference ports they are using). As another example, conference resource management unit 90 may identify that participant 70*b* is in close proximity to a conference room that is being used for the ongoing conference and asks participant 70*b* to join the conference from the conference room thereby freeing up conference resources.

In some embodiments, conference resource management unit 90 may check endpoint configuration or other information to determine whether endpoints of participants 70*c* and/or 70*d* have speaker or other capabilities to enable more than one participant to effectively use the endpoint on the conference. If, for example, endpoint 71*c* of participant 70*c* does not have speaker capability, then conference resource management unit 90 may not suggest and/or instruct participants 70*c* and 70*d* to join the conference together from endpoint 71*c* of participant 70*c*. Communications between conference participants currently participating on a conference, such as the communications discussed above with respect to conference participants 70*c* and 70*d*, may be transmitted using any suitable method, such as via whisper communication, instant message, e-page or SMS, to a particular endpoint that a conference participant is using to participate in the conference or through another endpoint accessible by the participant. For example, if a conference participant 70 is using a phone to participate on a conference, conference resource management unit 90 may send communications such as location change requests discussed above to a desktop endpoint associated with the participant.

In some embodiments, conference resource management unit 90 may request acknowledgement from a conference participant 70 that they would be willing to join other participants. If the participant reply is not affirmative, conference resource management unit 90 may continue to search for other participants who are willing to accommodate the new participant by, for example, changing their location or allowing the new participant to join the conference from their location. In particular embodiments, conference resource management unit 90 may announce the spoken name of the user who is trying to join the conference to better inform existing participants in their location change decision. For example, existing participants may be more likely to alter their location or participation options for higher priority new participants (e.g., an executive of an organization). In some embodiments, conference resource management unit 90 may initially target passive participants (e.g., participants who have not spoken or otherwise participated on the conference for a while) as prime candidates for joining other participants. In particular embodiments, if an attempt by conference system 60 free up conference ports or other resources fails, the system may default to a prompt to the new participant 70*a* trying to join the conference such as "All of the ports are busy; you cannot join the conference call."

In some embodiments, to prevent a race condition for use of a conference port or other resource freed up as a result of a change in the manner of participation by participants (e.g., change in location or endpoint usage), once a port or other resource is freed up, it is not returned to the general pool of free ports or resources usable by the particular conference at issue or another conference provided by conference system 60. Rather, conference resource management unit 90 allocates the freed up port or other resource to the new participant who was holding for it. In some embodiments, a class of service (COS) of new participants may be used to determine the order in which freed up ports and resources are allocated to enable new participants to join a conference. For example, conference system 60 may have multiple new participants waiting to join an existing conference upon changes in participation by existing conference participants. Instead of enabling new participants to join the conference based on a first come, first served method, conference resource management unit 90 may allocate ports and/or other resources to the new participants based on their priority level within an organization or other COS parameters.

In some embodiments, conference resource management unit 90 may identify for a new participant 70*a* trying to join a conference of the location of other existing participants 70*b*-70*d* even though there are currently enough ports and other available resources to enable the new participant 70*a* to join the conference. This option could be offered always, or only when the available ports/resources reach a particular threshold, such as a threshold near maximum use of the ports/resources. By offering a meet-live opportunity to the new participant, the conference port/resource utilization can be reduced proactively before there are no available ports/resources left. This feature could also be used to facilitate face-to-face meetings for participants. For example, in this embodiment conference resource management unit 90 might suggest: "There are N participants within X feet of you, would you like to join in person?" If the new participant agrees, the methods described above could be employed. In particular embodiments, a "face-to-face" option may be offered to any participant who would be unable to fully participate in the conference. For example, if the conference includes web and/or video collaboration, the "face-to-face" option could suggest a location to go to get all the available features of the conference if the participant would otherwise be unable to access all such features at his existing location.

Figure 3:
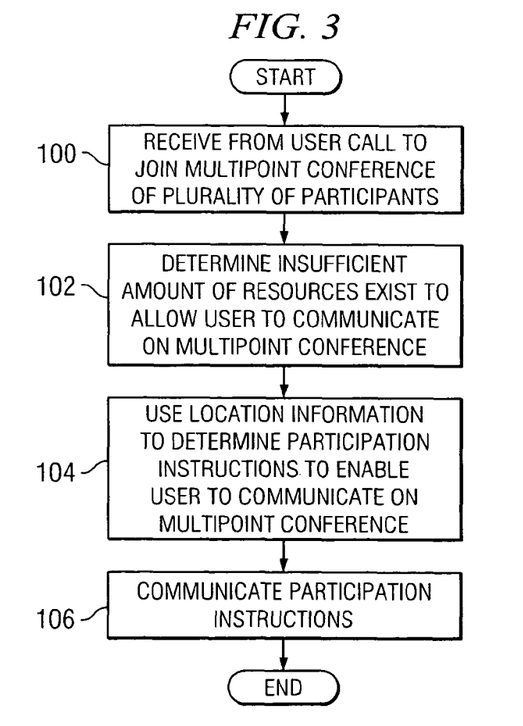
FIG. 3 is a flowchart illustrating a method for managing conference resources, in accordance with a particular embodiment.

FIG. 3 is a flowchart illustrating a method for managing conference resources, in accordance with a particular embodiment. The method begins at step 100 where a call is received from a user, for example from an endpoint associated with the user, to join a multipoint conference of a plurality of participants. Each participant may be communicating on the conference using a respective endpoint. At step 102, it is determined that an insufficient amount of resources exist to allow the user to communicate on the conference. For example, an insufficient amount of conference ports, DSP resources or other resources may be currently unavailable to allow the user to participate. Such unavailable may result from an insufficient amount of resources being reserved with a conference system hosting and/or otherwise facilitating the conference.

At step 104, location information is used to determine participation instructions to enable the user to communicate on the multipoint conference. The location information may be associated with the user and/or one or more of the conference participants. The location information may be determined in any of a variety of ways, such as through GPS, a call manager, a caller ID or IP address. The participation instructions may include, for example, suggestions for the user to join the conference using an endpoint of one of the current participants. The location information of the user and the current participant may be used to determine the feasibility and practicality of the user joining at the location of the current participant. In some cases, the participation instructions may include instructions for one of the current participants to hang up and join the conference at an endpoint of another current participant thus freeing up conference resources to enable the user to join the conference. Location information of such current participants may be used to determine these participation instructions as well. In some cases, the participation instructions may be determined based on participation activity of one or more current participants. For example, current participants who have not actively spoken or otherwise participated in some time may be more likely to be asked to move to a new location for conference participation.

At step 106, the participation instructions are communicated to the user or a current participant, as applicable. Instructions may be communicated to a current participant using, for example, whisper communication, instant messaging, e-page, short message service messaging or another method.

In some cases, a current participant may decline the participation instructions, and a conference system may then identify another participant for transmitting participation instructions comprising a suggestion to move to another location to participate on the conference to enable the user to join the conference.

As indicated above, in some embodiments participation instructions comprising a suggestion for a current participant to move locations to join the conference using another participant's endpoint may be determined and communicated when use of conference resources have reached a current threshold or otherwise, instead of merely when resources are no longer available to enable a user to join the conference. For example, a conference system may continuously or, upon manual or automatic command through configuration software, determine such participation instructions merely to reduce use resources to make the system operate more efficiently.

Some of the steps illustrated in FIG. 3 may be combined, modified or deleted where appropriate, and additional steps may also be added to the flowchart. Additionally, steps may be performed in any suitable order without departing from the scope of the invention.

Technical advantages of particular embodiments include systems and methods are provided that communicate to conference participants and new callers participation instructions comprising, for example, suggestions to participate on a conference based on location to reduce and/or use more efficiently conference resources. GPS information, presence information, wireless base stations, emergency responders, discovery protocols or other methods may be used to identify locations of callers and/or current call participants. Location information may be used to identify prospective grouping of a new caller with the conference participants and to identify prospective grouping of current conference participants resulting in a freed up conference port or other resources. Whisper, IM, SMS, e-page may be used to communicate with participants who could join other participants in order to free up resources. A pool of resources may be created and allocated to users in the order of their arrival. Freed up resources may be allocated first to new callers who have been waiting for them. In some cases, class of service of callers who are attempting to join a conference call may be used to allocate the freed up ports and other resources.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within a conference system, a conference resource management unit, an MCU and participant endpoints, these elements may be combined, rearranged or positioned in order to accommodate particular routing architectures or needs. In addition, any of these elements may be provided as separate external components to a conference system, a conference resource management unit, an MCU or a participant endpoint where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for managing conference resources, comprising:
    receiving from an endpoint of a first participant a call to join a multipoint conference between a plurality of participants, each participant communicating on the multipoint conference through a respective endpoint;
    determining that an insufficient amount of resources exist to allow the first participant to communicate on the multipoint conference using the endpoint of the first participant;
    determining participation instructions to enable the first participant to communicate on the multipoint conference using location information associated with at least one other participant of the plurality of participants, the participation instructions comprising instructions to the first participant to use the endpoint of the at least one other participant in order to communication on the multipoint conference; and
    communicating the participation instructions to the first participant.

2. The method of claim 1, wherein determining participation instructions to enable the first participant to communicate on the multipoint conference comprises using location information associated with the first participant and location information associated with at least one other participant of the plurality of participants to determine participation instructions to enable the first participant to communicate on the multipoint conference.

3. The method of claim 1, wherein communicating the participation instructions to the first participant comprises communicating the participation instructions to the first participant using whisper communication, instant messaging, e-page or short message service messaging.

4. The method of claim 1, further comprising:
    receiving from the first participant a refusal to join the at least one other participant on the conference;
    identifying a third participant of the plurality of participants based on location information associated with the third participant to join the at least one other participant to participate on the multipoint conference using the respective endpoint of the at least one other participant; and
    communicating to the third participant instructions to join the at least one other participant to enable the third participant to communicate on the multipoint conference.

5. The method of claim 1, wherein determining participation instructions to enable the first participant to communicate on the multipoint conference comprises using participation activity associated with at least one of the plurality of participants to determine participation instructions to enable the first participant to communicate on the multipoint conference.

6. The method of claim 1, wherein the insufficient amount of resources comprise an insufficient amount of conference ports.

7. The method of claim 1, wherein the insufficient amount of resources comprise an insufficient amount of DSP resources.

8. The method of claim 1, wherein determining that an insufficient amount of resources exist to allow the first participant to communicate on the multipoint conference comprises determining that an insufficient amount of resources have been reserved to allow the first participant user to communicate on the multipoint conference.

9. A method for managing conference resources, comprising:
   receiving from an endpoint of a user a call to join a multipoint conference between a plurality of participants, each participant communicating on the multipoint conference through a respective endpoint;
   determining, using location information associated with the user or at least one of the plurality of participants, participation instructions comprising instructions for the user or the at least one the plurality of participants to join another of the plurality of the participants to participate on the multipoint conference using the respective endpoint of the another of the plurality of participants; and
   communicating the participation instructions to the user or the at least one of the plurality of participants.

10. The method of claim 9, wherein participation instructions are determined when use of conference resources reaches a predefined threshold.

11. The method of claim 10, wherein the conference resources comprise conference ports.

12. The method of claim 10, wherein the conference resources comprise DSP resources.

13. A system for managing conference resources, comprising:
   an interface operable to receive from an endpoint of a first participant a call to join a multipoint conference between a plurality of participants, each participant communicating on the multipoint conference through a respective endpoint; and
   a processor coupled to the interface and operable to:
      determine that an insufficient amount of resources exist to allow the first participant to communicate on the multipoint conference using the endpoint of the first participant;
      determine participation instructions to enable the first participant to communicate on the multipoint conference using location information associated with at least one other participant of the plurality of participants, the participation instructions comprising instructions to the first participant to use the endpoint of the at least one other participant in order to communication on the multipoint conference; and
      communicate the participation instructions to the first participant.

14. The system of claim 13, wherein a processor operable to determine participation instructions to enable the first participant to communicate on the multipoint conference comprises a processor operable to use location information associated with the first participant and location information associated with at least one other participant of the plurality of participants to determine participation instructions to enable the first participant to communicate on the multipoint conference.

15. The system of claim 13, wherein a processor operable to communicate the participation instructions to the first participant comprises a processor operable to communicate the participation instructions to the first participant using whisper communication, instant messaging, e-page or short message service messaging.

16. The system of claim 13, wherein:
   the interface is further operable to receive from the first participant a refusal to join the at least one other participant on the conference; and
   the processor is further operable to:
      identify a third participant of the plurality of participants based on location information associated with the third participant to join the at least one other participant to participate on the multipoint conference using the respective endpoint of the at least one other participant; and
      communicate to the third participant instructions to join the at least one other participant to enable the third participant to communicate on the multipoint conference.

17. The system of claim 13, wherein a processor operable to determine participation instructions to enable the first participant to communicate on the multipoint conference comprises a processor operable to use participation activity associated with at least one of the plurality of participants to determine participation instructions to enable the first participant to communicate on the multipoint conference.

18. The system of claim 13, wherein the insufficient amount of resources comprise an insufficient amount of conference ports.

19. The system of claim 13, wherein the insufficient amount of resources comprise an insufficient amount of DSP resources.

20. The system of claim 13, wherein a processor operable to determine that an insufficient amount of resources exist to allow the first participant to communicate on the multipoint conference comprises a processor operable to determine that an insufficient amount of resources have been reserved to allow the first participant to communicate on the multipoint conference.

21. A system for managing conference resources, comprising:
   an interface operable to receive from an endpoint of a user a call to join a multipoint conference between a plurality of participants, each participant communicating on the multipoint conference through a respective endpoint; and
   a processor coupled to the interface and operable to:
      determine, using location information associated with the user or at least one of the plurality of participants, participation instructions comprising instructions for the user or the at least one the plurality of participants to join another of the plurality of the participants to participate on the multipoint conference using the respective endpoint of the another of the plurality of participants; and
      communicate the participation instructions to the user or the at least one of the plurality of participants.

22. The system of claim 21, wherein participation instructions are determined when use of conference resources reaches a predefined threshold.

23. The system of claim 22, wherein the conference resources comprise conference ports.

24. The method of claim 22, wherein the conference resources comprise DSP resources.

25. A system for managing conference resources, comprising:
- means for receiving from an endpoint of a first participant a call to join a multipoint conference between a plurality of participants, each participant communicating on the multipoint conference through a respective endpoint;
- means for determining that an insufficient amount of resources exist to allow the first participant to communicate on the multipoint conference using the endpoint of the first participant;
- means for determining participation instructions to enable the first participant to communicate on the multipoint conference using location information associated with at least one other participant of the plurality of participants, the participation instructions comprising instructions to the first participant to use the endpoint of the at least one other participant in order to communication on the multipoint conference; and
- means for communicating the participation instructions to the first participant.

26. A system for managing conference resources, comprising:
- means for receiving from an endpoint of a user a call to join a multipoint conference between a plurality of participants, each participant communicating on the multipoint conference through a respective endpoint;
- means for determining, using location information associated with the user or at least one of the plurality of participants, participation instructions comprising instructions for the user or the at least one the plurality of participants to join another of the plurality of the participants to participate on the multipoint conference using the respective endpoint of the another of the plurality of participants; and
- means for communicating the participation instructions to the user or the at least one of the plurality of participants.

27. Logic embodied in a computer readable medium, the computer readable medium comprising code operable to:
- receive from an endpoint of a first participant a call to join a multipoint conference between a plurality of participants, each participant communicating on the multipoint conference through a respective endpoint;
- determine that an insufficient amount of resources exist to allow the first participant to communicate on the multipoint conference using the endpoint of the first participant;
- determine participation instructions to enable the first participant to communicate on the multipoint conference using location information associated with at least one other participant of the plurality of participants, the participation instructions comprising instructions to the first participant to use the endpoint of the at least one other participant in order to communication on the multipoint conference; and
- communicate the participation instructions to the first participant.

* * * * *